United States Patent
Lin et al.

(10) Patent No.: US 10,013,739 B2
(45) Date of Patent: Jul. 3, 2018

(54) IMAGE ENHANCEMENT METHODS AND SYSTEMS USING THE SAME

(71) Applicant: HTC CORPORATION, Taoyuan, Taoyuan County (TW)

(72) Inventors: Chia Yen Michael Lin, Taoyuan (TW); Chia-Ho Pan, Taoyuan (TW); Jing-Lung Wu, Taoyuan (TW); Hsin-Ti Chueh, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 7 days.

(21) Appl. No.: 15/248,090

(22) Filed: Aug. 26, 2016

(65) Prior Publication Data
US 2016/0364843 A1    Dec. 15, 2016

Related U.S. Application Data

(62) Division of application No. 13/974,899, filed on Aug. 23, 2013, now Pat. No. 9,460,497.

(60) Provisional application No. 61/704,267, filed on Sep. 21, 2012.

(51) Int. Cl.
G06T 5/00    (2006.01)

(52) U.S. Cl.
CPC .............. G06T 5/00 (2013.01); G06T 5/007 (2013.01); *G06T 2207/20021* (2013.01)

(58) Field of Classification Search
CPC .......... H04N 9/78; H04N 19/117; G06T 5/20; G06T 2207/10024; G06T 2207/20021; G06T 5/00; G06T 5/007
See application file for complete search history.

(56) References Cited

U.S. PATENT DOCUMENTS

| | | | |
|---|---|---|---|
| 2005/0128539 A1 | 6/2005 | Takano et al. | |
| 2007/0110331 A1* | 5/2007 | Satoh | B60R 1/00 382/275 |
| 2007/0273793 A1 | 11/2007 | Harada et al. | |
| 2008/0144060 A1 | 6/2008 | Ishikawa | |
| 2008/0246883 A1 | 10/2008 | Murashita et al. | |
| 2009/0310884 A1 | 12/2009 | Lee et al. | |
| 2010/0080459 A1 | 4/2010 | Dai et al. | |
| 2010/0085361 A1 | 4/2010 | Kim et al. | |
| 2011/0150356 A1 | 6/2011 | Jo et al. | |
| 2012/0076404 A1 | 3/2012 | Bryant et al. | |
| 2012/0201453 A1 | 8/2012 | Furuya | |

(Continued)

FOREIGN PATENT DOCUMENTS

CN    102156961 A    8/2011

*Primary Examiner* — Jingge Wu
(74) *Attorney, Agent, or Firm* — Birch, Stewart, Kolasch & Birch, LLP

(57) ABSTRACT

An embodiment of an image enhancement method is introduced for use in an electronic device. An image composed of a plurality of pixel values is first received, and each pixel therein is separated into two channels. The image is further divided into a plurality of blocks. A distribution of a selected channel is determined for each block, which is selected from the two channels. For each pixel, the pixel value of the selected channel is adjusted according to at least one distribution corresponding to at least one neighboring block. For each pixel, the pixel value of the other channel is adjusted according to the adjusted pixel value of the selected channel. As a result, the adjusted image is provided.

8 Claims, 5 Drawing Sheets

(56) References Cited

U.S. PATENT DOCUMENTS

2012/0301026 A1 11/2012 Fukunaga
2013/0033517 A1 2/2013 Choi et al.
2016/0267647 A1* 9/2016 Higo .................... G06T 7/0004

* cited by examiner

IMAGE ENHANCEMENT METHODS AND SYSTEMS USING THE SAME

CROSS REFERENCE TO RELATED APPLICATIONS

This application is a Divisional of copending U.S. patent application Ser. No. 13/974,899, filed on Aug. 23, 2013, which claims the benefit of U.S. Provisional Application No. 61/704,267 filed on Sep. 21, 2012, all of which are hereby expressly incorporated by reference into the present application.

BACKGROUND

Technical Field

The present invention relates to image enhancement methods and systems using the same, and in particular, it relates to methods for improving image quality by adjusting luminance and chrominance values when an image is captured under bad conditions.

Description of the Related Art

There are many detrimental situations that the photographer encounters and are difficult to control when taking photos, resulting in poor-quality images. For example, taking photographs where the light is behind the subject (also called backlight condition) causes the edges of the subjects, such as people, to glow, while the other areas of the subjects remain darker. Or, shooting the subject standing in insufficient light (also called low-light condition) causes the subject of the captured images to look darker. When the lighting conditions are bad, the images captured by digital cameras may not be satisfactory. Accordingly, there is a need for an image processing method to improve image quality when the images are captured under the aforementioned bad conditions.

BRIEF SUMMARY

In the embodiments of the invention, image quality is enhanced by compensating luminance values to certain image portions that might be too dark. For each pixel within the image, the luminance value is adjusted with reference to neighboring blocks. Subsequently, a chrominance adjustment for each pixel is performed according to the luminance compensation results. Therefore, the image sharpness and contrast may be improved.

An embodiment of an image enhancement method is introduced for use in an electronic device. An image composed of a plurality of pixel values is first received, and each pixel therein is separated into two channels. The image is further divided into a plurality of blocks. A distribution of a selected channel is determined for each block, which is selected from the two channels. For each pixel, the pixel value of the selected channel is adjusted according to at least one distribution corresponding to at least one neighboring block. For each pixel, the pixel value of the other channel is adjusted according to the adjusted pixel value of the selected channel. As a result, the adjusted image is provided.

An embodiment of an image enhancement method is introduced for use in an electronic device. An image is first received. A plurality of pixel values within the image are separated into a plurality of luminance values and a plurality of chrominance values. A block-based adjustment is performed on the luminance values, where the image is divided into a plurality of blocks. An adjustment on the chrominance values is performed according to the results of luminance value adjustment. As a result, the adjusted image is displayed on a display unit.

An embodiment of an image processing system configured in an electronic device is introduced. A block determination unit herein is configured to determine a representative luminance value for each block of an image and assign a luminance profile to each block according to the representative luminance value. An adjustment unit herein is coupled to the block determination unit and configured to receive the luminance profile assignment to each block and, for each pixel of the image, determine at least one neighboring block for the pixel, determine a distance from the pixel to each neighboring block, and adjust each luminance value of the image according to at least one luminance profile of the neighboring block and at least one distance.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
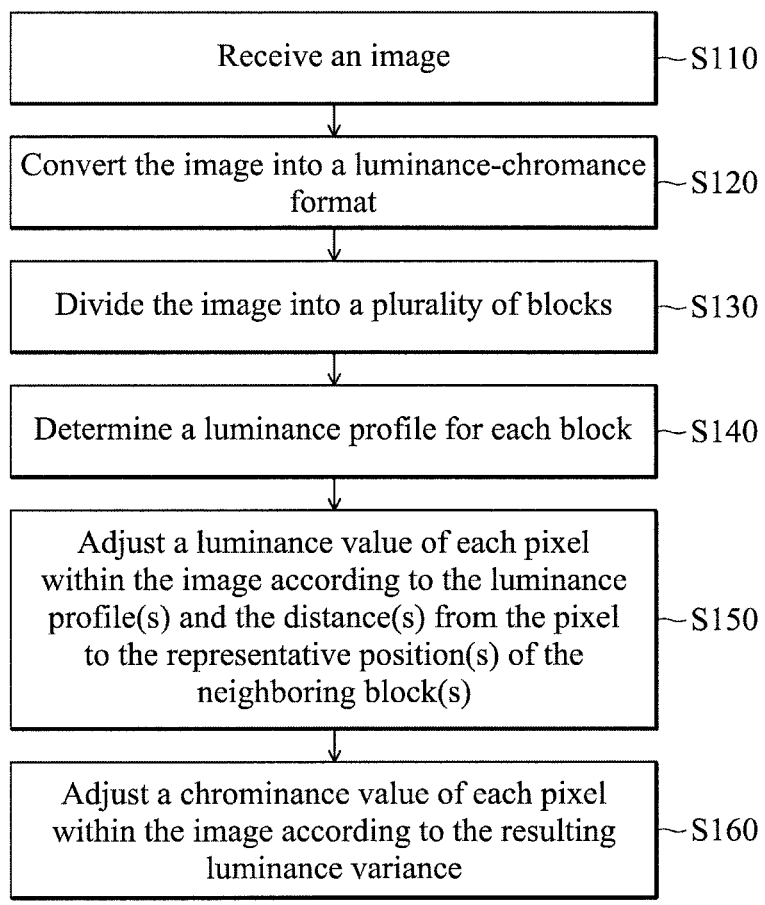
FIG. 1 is a flowchart illustrating an image enhancement method according to an embodiment of the invention.

FIG. 1 is a flowchart illustrating an image enhancement method according to an embodiment of the invention. An image is first received, which may be of any image format (step S110). In the case that the received image is not in the format representing luminance and chrominance, the image needs further conversion. Typically, the image captured by an image sensor of a camera module is of the RGB format, and is converted into a luminance-chrominance format (step S120). For example, the image may be converted from the RGB format into the HSV or YUV format. HSV stands for "hue", "saturation", and "value", and is a cylindrical-coordinate representation of points in an RGB color model. In the cylinder, the angle around the central vertical axis corresponds to "hue", the distance from the axis corresponds to "saturation", and the distance along the axis corresponds to "value". V may be directly considered as a luminance channel while HS may be considered as chrominance channels. Alternatively, the HSV channels may require additional conversion to luminance and chrominance channels. The YUV format defines a color space in terms of one luminance (Y) and two chrominance (UV) channels, and is created from the RGB color model. Since the conversion between RGB and HSV or YUV is known to those skilled in the art, it is omitted hereinafter for brevity. Then, the image is divided into a plurality of blocks (M×N), each block may comprise K×L pixels (step S130). For example, suppose that an image consists of 1280×1024 pixels, the image may be divided into 80×64 blocks as each block contains 16×16 pixels. For each block, a corresponding luminance profile is determined (step S140). The luminance profile is used to adjust the luminance values of pixels in the designated block. Each block may correspond to a different luminance profile, leading to the luminance adjustments being performed independently. Conventionally, the luminance adjustment is performed for the whole image. However, when taking backlight photos, some portions of the captured image may be under-exposed while others may be over-exposed. The conventional overall adjustment oftentimes yields worse image quality, for example, when some regions of the adjusted image look too bright or too dark. It is advantageous to perform the block-based luminance adjustment, because the luminance of the under-exposed portions can be improved while the over-exposed portions can be maintained or suppressed. The luminance profile is used to map the original luminance value to a new luminance value. This mapping may be achieved by a predefined mapping table or mathematic function. If a representative luminance value of a block is relatively low, a luminance profile may be selected to increase its brightness. If a representative luminance value of a block is relatively high, another luminance profile may be selected to decrease its brightness. Once the luminance profile of each block is determined, the luminance value of each pixel within the image may be adjusted according to one or more determined luminance profiles and the distance(s) from the pixel to the representative position(s) of the neighboring block(s) (step S150), in which the pixel is resident in one of the neighboring block(s). The representative positions may be the centers of the blocks. Since the differences among representative luminance values of neighboring blocks may be big, simply applying a single luminance profile to all pixels within one block may lead to unsmooth luminance distribution across blocks and cause the adjusted image to look unnatural. Therefore the luminance adjustment for each pixel not only refers to the luminance profile of the block that the pixel is resident in, but also, if required, the luminance profile(s) of the other neighboring block(s). Specifically, the neighboring block(s) is/are first determined for each pixel. One or more luminance values are obtained according to luminance profile(s) for the determined block(s). In an example, a final luminance value for the pixel is produced by a weighted sum of the obtained luminance values, wherein the weights are calculated according to the distance(s) from the pixel to the determined block(s). In another example, a final luminance value may be calculated by averaging the obtained luminance values without considering the distance(s) therebetween. The above calculations for a final luminance value are not exhaustive, and it would be understood that other algorithms can be applied thereto. After the luminance adjustment is done, a chrominance value of each pixel within the received image may be adjusted according to the resulting luminance variance (step S160). The resulting luminance variance may be obtained by subtracting the final luminance value from the original luminance value. In an example, the chrominance value may be adjusted according to the ratio of the final luminance value to the original luminance value, so that the chrominance adjustment may follow the same proportion of the luminance adjustment. In another example, the chrominance value may be adjusted according to the ratio of the final luminance value to the original luminance value, and a scaling factor as well. The scaling factor may be used to enhance the color. And in the final step, the new luminance value and chrominance value may be applied to pixels within the image.

Figure 2:
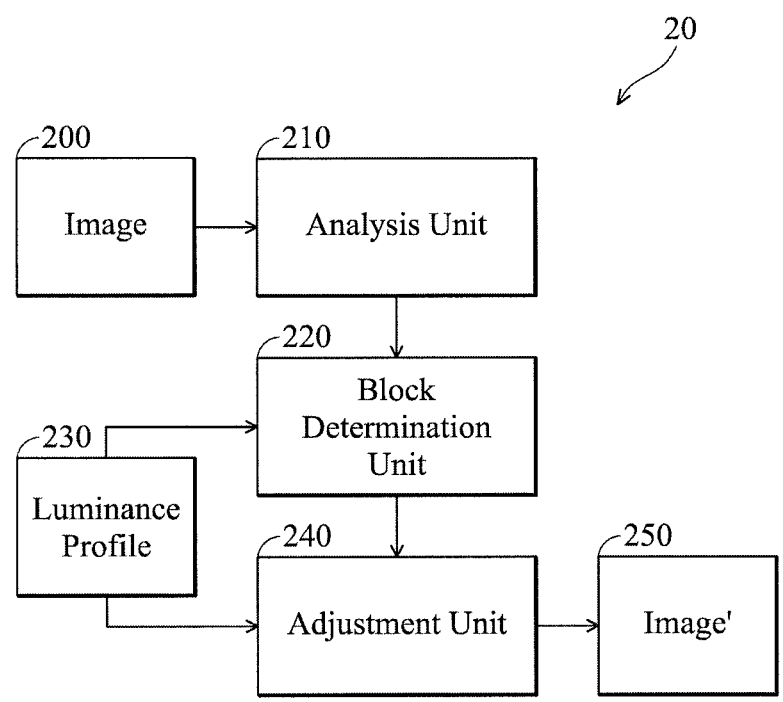
FIG. 2 illustrates an image processing system for image enhancement according to an embodiment of the invention.

Please refer to FIG. 2 illustrating an image processing system for image enhancement according to an embodiment of the invention. The image processing system 20 comprises at least an analysis unit 210, a block determination unit 220, and an adjustment unit 240. The analysis unit 210 is configured to receive an image 200, convert each pixel value thereof into luminance and chrominance channels, and calculate a luminance distribution within the received image. Luminance values may be further separated into high frequency components and low frequency components. The low frequency components are low-pass values of the luminance channel, while the high frequency components may carry noise or detailed information. For example, the high frequency components may be the AC coefficients while the low frequency components may be the DC coefficients. The aforementioned separation into two components may be achieved by a low pass filter. The low frequency components are sent to the block determination unit 220. The analysis unit 210 may further calculate a luminance histogram for the image 200 and determine whether the image 200 needs to be enhanced according to the luminance histogram. The luminance histogram is a luminance distribution of the image 200 and provides a general appearance description of the image 200. For example, it is determined that the image 200 needs to be enhanced when a large portion of the luminance values lies on the dark side or the bright side, or the luminance distribution shows extreme peaks in certain predefined ranges. It is to be understood that determination accuracy may be improved since the analysis uses the low frequency components, which are less influenced by noise than the high frequency components. In response to the determination suggesting that no enhancement is needed, the analysis unit 210 may terminate the process; otherwise, the image 200 is sent to the block determination unit 220.

The block determination unit 220 may divide the image 200 into a plurality of blocks, for example, M×N blocks. The block determination unit 220 determines a representative luminance value corresponding to each of the M×N blocks. In an example, the representative luminance value may be calculated by averaging the low frequency components within the block. In another example, the representative luminance value may be the median value of all low frequency components within the block, which separates the higher half of the low frequency components from the lower half. In still another example, the representative luminance value may be the mode value of all low frequency components within the block, which has the highest pixel count. In other examples the representative luminance value can be calculated by averaging the luminance values within the block without separating into low frequency and high frequency components. The above examples are not exhaustive, and it will be understood that other mathematical calculations can be employed to determine representative luminance values for the divided blocks. The block determination unit 220 may select a relevant luminance profile 230 for each block according to its representative luminance value. The luminance profile may be implemented by a look-up table and stored in a memory unit. The luminance profile comprises mappings between luminance values and is utilized to map original luminance values of block pixels to new ones. After the luminance profile for each block is determined, the block determination unit 220 may send representative luminance values each along with an identifier indicating one luminance profile to the adjustment unit 240. And then, the adjustment unit 240 may adjust luminance and chrominance values pixel by pixel within the image. For each pixel, the luminance value is first adjusted according to the luminance profiles of the neighboring blocks and weighting factors corresponding to the distance(s) from the pixel to the representative position(s) of the neighboring block(s), in which the pixel is resident in one of the neighboring block(s). The representative positions may be the centers of the blocks. The exemplary adjustment details may refer to the description of the aforementioned step S150 and are omitted herein for brevity. In some embodiments, the above adjustment is applied to low frequency components first, and then, adds high frequency components back to produce final luminance values. Once the adjustment of the luminance values is completed, chrominance values may be adjusted according to the resulting luminance variance. The exemplary adjustment details may refer to the description of the aforementioned step S160 and are omitted herein for brevity.

In another embodiment of the invention, the analysis unit 210 may also perform additional processing on the image. A saturation map comprising saturation values of the image is calculated and normalized into values between 0 and 1. The saturation map can be sent to the adjustment unit 240 for adjusting the luminance values of the image. In this embodiment, the final luminance value for each pixel is calculated by using the saturation value as weight for combining the original luminance value and the adjusted luminance value generated by block partition. Denote the original luminance value as P and the luminance value adjusted by block partition as P', the final luminance value P'' is $P_s \times P + (1-P_s) \times P'$, where $P_s$ is the saturation value. P' is generated by separating P into high frequency and low frequency components and adjusting the low frequency component as described above. The high frequency component is added back to the adjusted low frequency component to form the final P'. The chrominance value is adjusted according to the luminance variance of P and P''.

Finally, the adjustment unit 240 applies the new luminance and chrominance values to pixels and accordingly generates the resulting image 250. The resulting image 250 may be stored in a storage unit, such as a memory card, a mass storage device, a hard drive, or others, or displayed on a display unit (not shown). In an example, the resulting image may maintain the luminance-chrominance format, such as the HSV, the YUV format, or others. In another example, the final luminance and chrominance values may be converted into another format for storage, such as the RGB format, or others. Please note that the intermediate luminance and chrominance values may be temporarily stored in a storage unit for use by the units 210, 220 and 240, and be cleared upon the process completes. Please also note that the low frequency components and high frequency components may also be stored separately. The original image may be reserved as a copy or be overwritten with new luminance and chrominance values. The above-described units 210, 220 and 240 can be implemented in any of numerous ways. For example, they may be implemented using hardware, software or a combination thereof. It should be appreciated that any component or collection of components that perform the functions described above/hereinafter can be generically considered as one or more controllers that control the above/hereinafter discussed function. The one or more controllers can be implemented in numerous ways, such as with dedicated hardware, or with general-purpose hardware (e.g., one or more processor) that is programmed using microcode or software to perform the functions recited above/hereinafter. The above-described units 210, 220 and 240 may be incorporated in an enclosure to form an electronic device, such as a digital camera, a video recorder, a mobile phone, a notebook computer, a desktop computer, or others.

Figure 3:
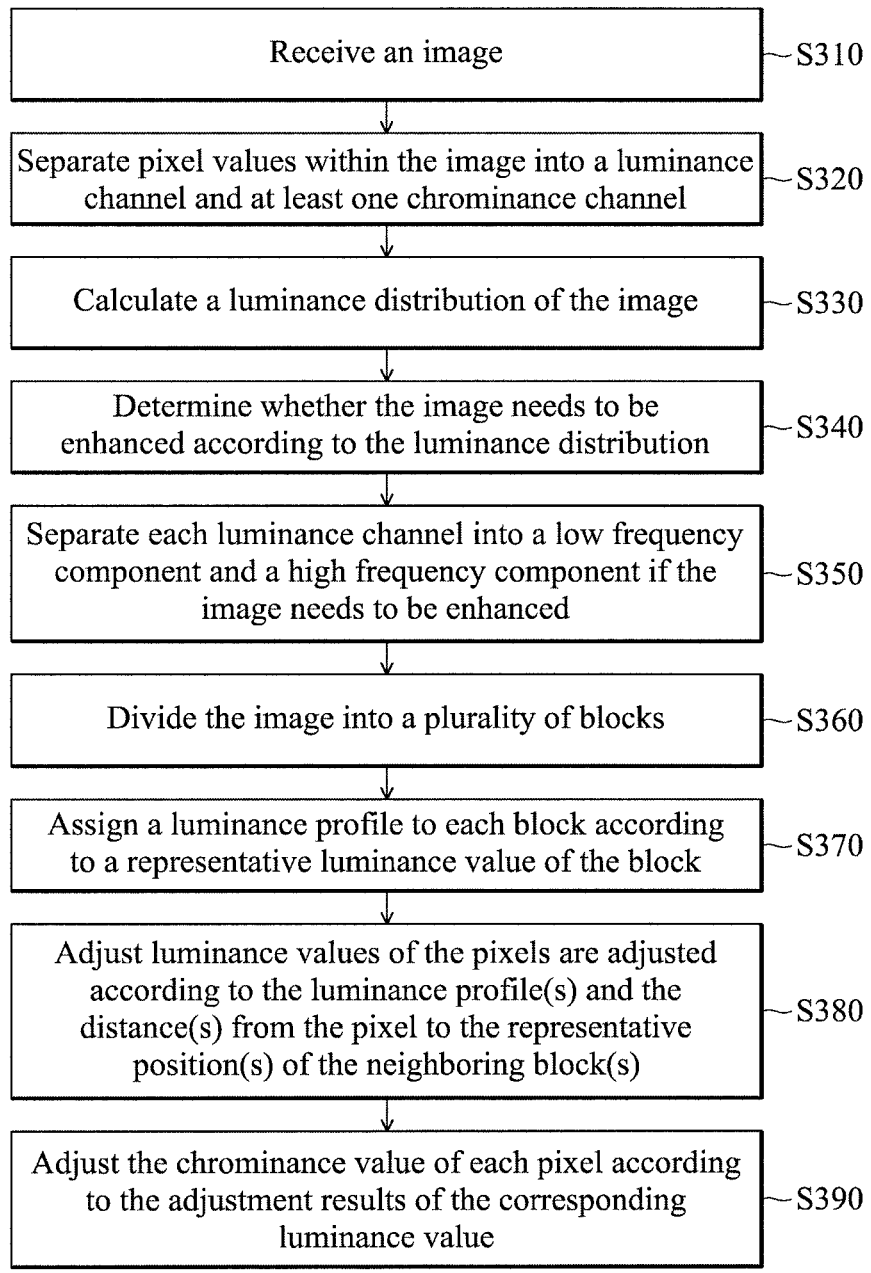
FIG. 3 is a flowchart illustrating an image enhancement method according to an embodiment of the invention.
Figure 4:
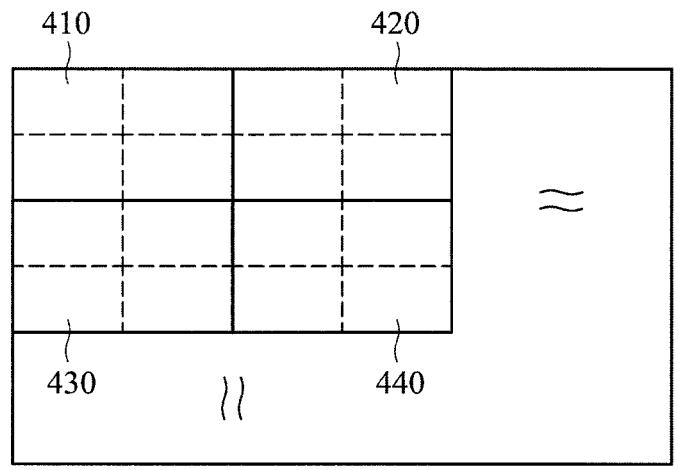
FIG. 4 is a schematic diagram illustrating an exemplary block division.
Figure 5:
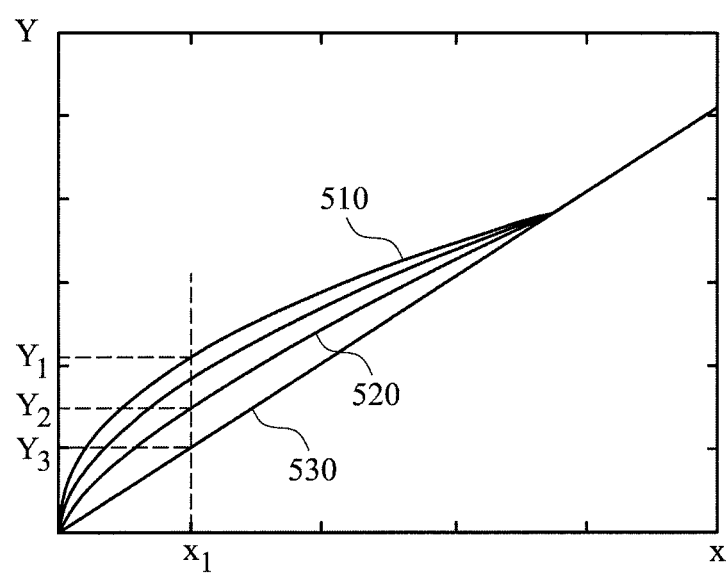
FIG. 5 shows exemplary luminance profiles.

FIG. 3 is a flowchart illustrating an image enhancement method according to an embodiment of the invention, which may be implemented in the system of FIG. 2. An image is received first (step S310), for example, from an image capture unit (e.g. a camera) or a storage unit (e.g. a memory, a hard drive, a mass storage, a website, etc.). Pixel values within the received image are separated into at least two channels, for example a luminance channel and at least one chrominance channel (step S320). The detailed separation into the luminance and chrominance channels may refer to the description of step S120, and is omitted herein for brevity. Then a luminance distribution of the image is calculated (step S330). The process then determines whether the image needs to be enhanced according to the luminance distribution (step S340). For example, a luminance histogram may be generated to represent the luminance distribution, and the determination may be made when the luminance histogram meets certain conditions. Specifically, the image needs to be enhanced when the luminance histogram suggests the backlight condition or the low light condition. When the image needs to be enhanced, the luminance channel for each pixel value may be further separated into a low frequency component and a high frequency component (step S350). Details of the separation of the low and high frequency components may refer to the above description of the analysis unit 210, and are omitted herein for brevity. However, in other embodiments of the invention, the luminance channel needs not be separated into two components. In these embodiments, step S350 can be skipped. Then, the image is divided into a plurality of blocks (step S360). FIG. 4 is a schematic diagram illustrating an exemplary block division, where the image is divided into at least blocks 410, 420, 430 and 440. A representative luminance value may be obtained by averaging the low frequency components of all pixels within each block. In embodiments that luminance channel is not separated, the representative luminance value may be obtained by averaging the luminance values of all pixels within each block. A relevant luminance profile is assigned to each block according to the representative luminance value of the block (step S370). The luminance profile may be implemented in a look-up table, a mathematical function, or others, to map a luminance value within the block 410, 420, 430 or 440 to a new one. FIG. 5 shows exemplary luminance profiles. For example, the luminance profile 510 is assigned when the representative luminance value of a block is lower than a first threshold, indicating that the block is under-exposed, while the luminance 520 or 530 is assigned when the representative luminance value of a block is higher than a second threshold, indicating that the block is over-exposed. It can be observed through FIG. 5 that, given the same luminance value $x_1$, the mapped luminance value $y_1$ with the luminance profile 510 is higher than the mapped luminance value $y_2$ or $y_3$ with the luminance profile 520 or 530. Therefore, although two pixels have the same luminance value, different luminance values are mapped when the applied luminance profiles are different.

Figure 6:
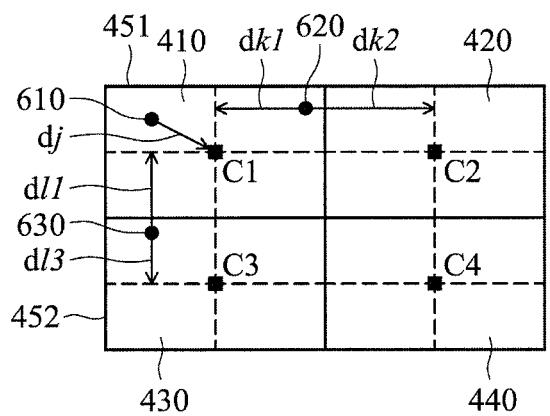
FIGS. 6 and 7 illustrate exemplary luminance adjustments to three types of pixels.
Figure 7:
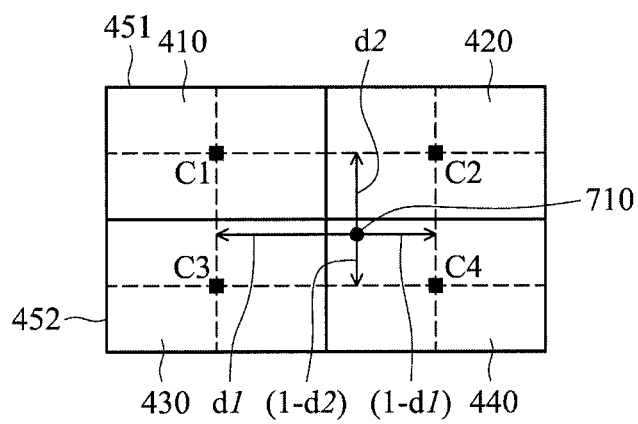

After the luminance profile corresponding to each block is determined, luminance values of the pixels are adjusted according to the luminance profile(s) and the distance(s) from the pixel to the representative position(s) of the neighboring block(s). FIGS. 6 and 7 illustrate exemplary luminance adjustments to three types of pixels. Assume that the blocks 410 to 440 are four blocks of the upper-left corner of the received image, a luminance profile is applied to each of which according to a representative luminance value thereof. Calculation details of the representative luminance values may refer to the aforementioned description of the block determination unit 220, and are omitted herein for brevity. For each pixel, the distance to the center of a neighboring block, denoted as C1, C2, C3 or C4, is calculated. The distances are served as weighting factors. As can be observed, one pixel may be surrounded by up to four centers of neighboring blocks. When pixels are near the edge(s) of the image, for example, edge(s) 451 or/and 452 of FIGS. 6 and 7, the pixel may be surrounded by one or two centers of neighboring blocks. The neighboring block for one pixel means that the distance between the pixel and its representative position (e.g. its center) is less than the maximum slant distance of one block. With reference made to FIG. 6, the pixel 610 is positioned in the upper-left corner of the image and only refers to the center C1, therefore, the distance from 610 to C1 is denoted as dj. The pixel 610 may be referred to as a corner pixel. It is to be understood that the distance may be normalized, such that the distance from any pixel to any center of a neighboring block falls within a range from 0 to 1. For example, a maximum slant distance of 22.7 pixels is given for a 16×16 pixel block, the distance dj is about 0.5 (11.3/22.7) when the pixel 610 is away from the center C1 by 11.3 pixels. The low frequency component of the pixel 610 is calculated as follows:

$$PjL'=dj \times F(B1,PjL) \qquad (1)$$

where B1 denotes the luminance profile of the block 410 and F(B1, PjL) denotes a mapping function to obtain a new luminance value by mapping the original luminance value PjL of the pixel 610 according to the luminance profile B1.

Another type as shown in FIG. 6 is the luminance adjustment to an edge pixel, such as the pixel 620 or 630. The distances from the edge pixel 630 to the centers C1 and C3 are denoted as d11 and d13, respectively. The distances from the edge pixel 620 to the centers C1 and C2 are denoted as dk1 and dk2, respectively. The low frequency component of the pixel 630 is calculated as follows:

$$PlL'=d11 \times F(B1,PlL)+d13 \times F(B3,PlL) \qquad (2)$$

where B1 and B3 denote the luminance profiles of the blocks 410 and 430, respectively, and F(B1, PlL) and F(B3, PlL) denote mapping functions to obtain new luminance values by mapping the original luminance value PlL of the pixel 630 according to the luminance profiles B1 and B3, respectively. The low frequency component of the pixel 620 is calculated as follows:

$$PkL'=dk1 \times F(B1,PkL)+dk2 \times F(B2,PkL) \qquad (3)$$

where B1 and B2 denote the luminance profiles of the blocks 410 and 420, respectively, and F(B1, PkL) and F(B2, PkL) denote mapping functions to obtain a new luminance value by mapping the original luminance value PkL of the pixel 620 according to the luminance profiles B1 and B2, respectively.

The other type as shown in FIG. 7 is the luminance adjustment to an intermediate pixel, such as 710, which is surrounded by four centers C1 to C4 of blocks 410 to 440. The horizontal distance from the pixel 710 to the center C1 of the block 410 or the center C3 of the block 430 is d1. Since the distances are normalized as described above, the horizontal distance from the pixel 710 to the center C2 of the block 420 or the center C4 of the block 440 is (1−d1). The vertical distance from the pixel 710 to the center C1 of the block 410 or the center C2 of the block 420 is d2. The vertical distance from the pixel 710 to the center C3 of the block 430 or the center C4 of the block 440 is (1−d2). The low frequency component of the pixel 710 is calculated as follows:

$$PiL'=d1 \times d2 \times F(B1,PiL)+d2 \times (1-d1) \times F(B2,PiL)+d1 \times (1-d2) \times F(B3,PiL)+(1-d1)(1-d2) \times F(B4,PiL) \qquad (4)$$

where B4 denotes the luminance profile of the block 440, and F(B1, PiL), F(B2, PiL), F(B3, PiL), and F(B4, PiL) denote mapping functions to obtain new luminance values by mapping the original luminance value PiL of the pixel Pi according to the luminance profiles B1, B2, B3 and B4, respectively.

It can be observed by the exemplary equations (1) to (3) with reference made to FIG. 6 that the luminance adjustment to any corner or edge pixel affected by one neighboring block is weighted by one distance to the center of the neighboring block, also called one-dimensional weighting. With reference made to the exemplary equation (4) and FIG. 7, the luminance adjustment to any intermediate pixel affected by one neighboring block is weighted by two distances to two centers of the neighboring blocks, also called two-dimensional weighting. Although the weighting factors as shown in the equations (2) to (4) are represented by vertical or horizontal offsets between the candidate pixels and the centers of the neighboring blocks, it is understood that alternative calculations are feasible, such as normalized distances from candidate pixels straight to the centers of neighboring blocks.

After the low frequency components are adjusted, the high frequency components are added back to reserve significant characteristics carried therein. The final luminance value of the pixel 710, for example, is calculated as follows:

$$Pi'=PiL'+PiH \qquad (5-1)$$

where PiL' denotes the adjusted low frequency component, and PiH denotes the original high frequency component.

In another embodiment of the invention, the luminance value is further adjusted with reference to the saturation value. The saturation value $P_s$ is utilized for weighting the original luminance value and the adjusted luminance value. The final luminance value is calculates as follows:

$$Pi'=Ps \times Pi+(1-Ps) \times (PiL'+PiH) \qquad (5-2)$$

Next, the chrominance value of each pixel is adjusted according to the adjustment results of the corresponding luminance value (step S390). The final chrominance value of the pixel 710, for example, is calculated as follow:

$$PiC'=C \times S \times PiC \qquad (6)$$

$$C=1+(Pi'-Pi)/Pi \qquad (7)$$

where PiC denotes the original chrominance value of the pixel 710, S is a constant, which is a predefined saturation factor configured by system or user, C suggests a contrast factor determined according to the luminance variance, and Pi denotes the original luminance value of the pixel 710.

The saturation factor may be determined according to a saturation map of the chrominance values. Although the saturation factor is predefined as shown in the exemplary equation (6), it is understood that alternative embodiments are contemplated, such as dynamically changed in response to some other processing results. Besides, the contrast factor may be calculated by a similar but different equation without departing from the spirit of the invention.

Accompanying with the image processing system as shown in FIG. 2, it is to be understood that steps S310 to S340 may be performed in the analysis unit 210, the steps S350 to S370 may be performed in the block determination unit 220, and the steps S380 to S390 may be performed in the adjustment unit 240.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image enhancement method for use in an electronic device, comprising:
   receiving an image composed of a plurality of pixel values;
   separating each pixel value within the image into two channels;
   dividing the image into a plurality of blocks;
   determining a distribution of a selected channel for each block;
   for each pixel, adjusting the pixel value of the selected channel according to at least one distribution corresponding to at least one neighboring block;
   for each pixel, adjusting the pixel value of the other channel according to the adjusted pixel value of the selected channel; and
   providing the adjusted image,
   wherein the adjustment of the selected channel for each pixel further comprises:
      determining a representative value of the selected channel for each neighboring block;
      selecting a profile according to the determined representative value; and
      mapping the pixel value of the selected channel according to the profile, and wherein the mapping of the pixel value of the selected channel further comprises:
      for each pixel, calculating a distance from the pixel to each of the neighboring block or blocks;
      determining at least one weighting factor corresponding to at least one neighboring block according to at least one calculated distance; and
      adjusting the pixel value of the selected channel according to the determined weighting factor and the profile corresponding to the neighboring block,
      wherein one neighboring block comprises the pixel.

2. The image enhancement method of claim 1, wherein the adjustment of the other channel further comprises:
   for each pixel, determining a ratio according to a difference between the original pixel value of the selected channel and the adjusted pixel value of the selected channel; and
   adjusting the pixel value of the other channel according to the ratio.

3. The image enhancement method of claim 1, wherein the determining of the distribution of selected channel further comprises:
   separating the pixel values of the selected channel into two components.

4. The image enhancement method of claim 3, wherein the adjustment of pixel values of the selected channel further comprises:
   for each pixel, adjusting one selected component of the pixel value according to the profile corresponding to the block; and
   combining the adjusted component with the other component to generate the adjusted pixel value of the selected channel.

5. The image enhancement method of claim 4, wherein the profile is determined according to an average value of the selected component.

6. An image enhancement method for use in an electronic device, comprising:
   receiving an image;
   separating a plurality of pixel values within the image into a plurality of luminance values and a plurality of chrominance values;
   performing a block-based adjustment on the luminance values, wherein the image is divided into a plurality of blocks;
   performing an adjustment on the chrominance values according to the results of luminance value adjustment; and
   displaying the adjusted image on a display unit,
   wherein the performing of the block-based adjustment on the luminance values further comprises:
      determining a luminance profile for each of the blocks; and
      adjusting the luminance values according to the luminance profiles,
      separating the luminance values into a plurality of low frequency components and a plurality of high frequency components by a low pass filter;
      adjusting the low frequency components according to the luminance profiles; and
      combining the adjusted low frequency components and the high frequency components to form adjusted luminance values.

7. The image enhancement method of claim 6, wherein, for each block, the luminance profile is determined according to a representative luminance value of the block, and the representative luminance value is calculated from the low frequency components of the luminance values within the block.

8. The image enhancement method of claim 6, wherein the performing of the adjustment on the luminance values further comprises:
   determining a saturation value according to a saturation map of the chrominance values; and
   adjusting the luminance values according to the determined saturation factor and the adjusted luminance values.

* * * * *